Feb. 9, 1971  F. E. BALDWIN ET AL  3,561,194
EXHAUST GAS CONDITIONER
Filed Feb. 16, 1968
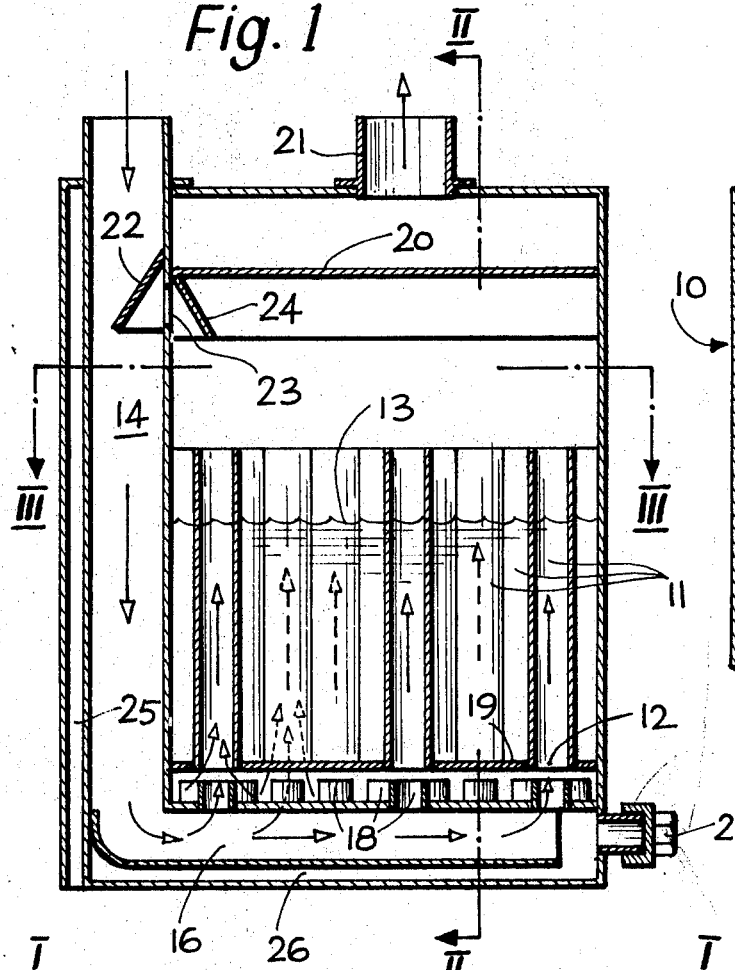
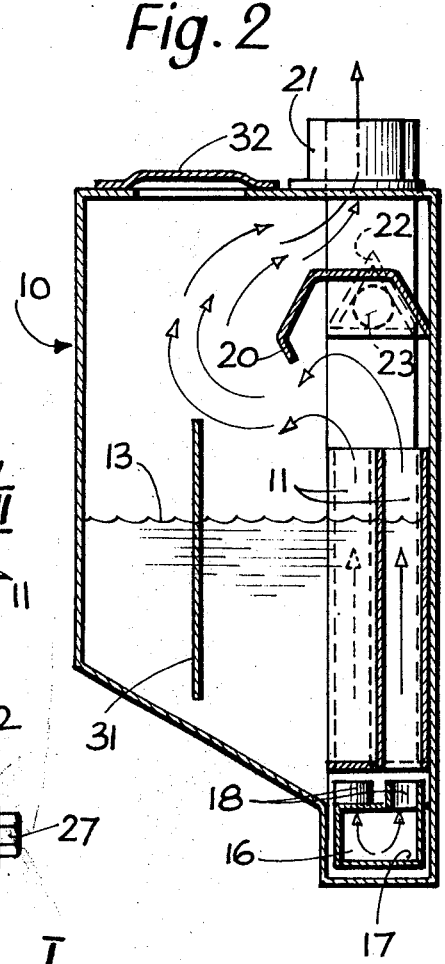
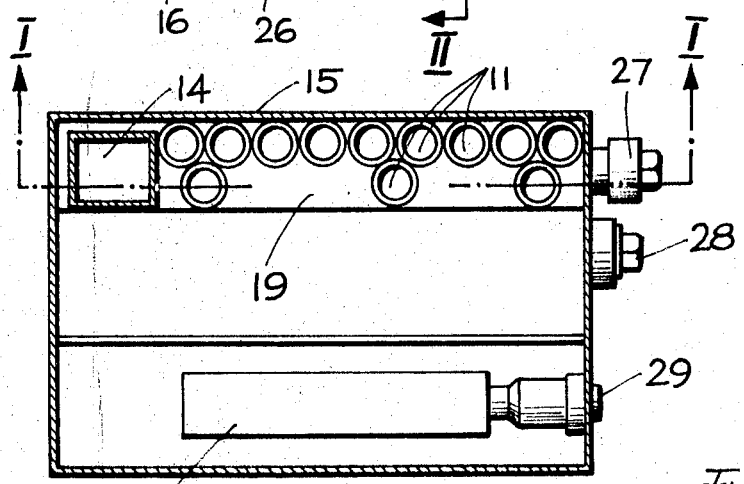
Inventors:
Franklin Ernest Baldwin
Maurice Walter Baldwin
BY
Agent

3,561,194
EXHAUST GAS CONDITIONER

Franklin Ernest Baldwin, 36 Cecil Ave., and Maurice Walter Baldwin, 61 Cecil Ave., both of Castle Hill, New South Wales, Australia
Filed Feb. 16, 1968, Ser. No. 705,986
Claims priority, application Australia, Feb. 17, 1967, 17,892/67
Int. Cl. B01d 47/02
U.S. Cl. 55—249     1 Claim

ABSTRACT OF THE DISCLOSURE

An exhaust gas conditioner for use with internal combustion engines, particularly diesel engines in confined and hazardous places such as coal mines. The conditioner which also acts as a flame trap has a gas inlet with anti-suck back means and the inlet gas passes into a water filled chamber where it is cooled and scrubbed by contact with the water and separated therefrom, some of the water being used to quench the incoming gas as it passes into a distributor and mixing tube associated with the chamber.

---

This invention relates to an exhaust gas conditioner and particularly to such a conditioner which may be used with internal combustion engines in mines or other atmospheres where there is a risk of gas explosion.

The object of the present invention is to provide a conditioner which will effectively scrub the gas and remove impurities therefrom and at the same time cool down the exhaust gas to an acceptable level.

It is known to use a conditioner in which the gas is discharged through a container filled with water so that the water cools the gas and scrubs any impurities therefrom. The conditioner of the present invention concerns improvements in such a device.

In accordance with the present invention there is provided an exhaust gas conditioner comprising a container a gas inlet duct into the container, a gas outlet from the container, a water receiving portion in the container, a gas distribution member connected to the gas inlet and passing below the water level in the water receiving portion, the gas distribution member having apertures positioned below associated mixing tubes so that when gas passes into the gas distribution member it discharges up through said apertures and induces a flow of water up through said tubes, and a deflector member for deflecting water issuing from said tubes so that it discharges back towards the water in the water receiving portion so that entrained gas separates from the water and passes out through the outlet.

The invention is hereinafter described by way of example with reference to the accompanying drawings in which:

FIG. 1 is a sectional side elevation of the exhaust gas conditioner of this invention;

FIG. 2 is a sectional end elevation of the construction of FIG. 1; and

FIG. 3 is a sectional plan elevation of the device of FIG. 1.

In the preferred construction a container 10 is provided in a selected area with a plurality of inclined or vertical mixing tubes 11 the lower ends 12 of which are arranged below the water level 13. The exhaust gas enters through a duct 14 which is spaced from walls of the container 10. The plurality of tubes may be replaced with a single tube of sufficient capacity.

The tubes 11 are about one and a half inches diameter and twelve inches high and are arranged vertically along one wall 15 in one or more rows. Underneath the line of tubes is a distribution member 16 connected to the inlet duct 14. The member 16 comprises a rectangular tube with a bottom wall 17, which tube may have portions thereof integral with or separate from the container. The distribution member 16, which is positioned in a recess in the bottom of the container, has a series of short tubular projections 18 extending towards or into the lowermost ends 12 of the tubes 11 so that the gas passes up into the tubes 11 and induces a flow of water through the space between the gas distribution projections 18 and the lowermost ends 12 of the tubes 11.

A horizontal stay 19 is provided across the tubes 11 at the bottom to prevent them from vibrating free from the container 10. The tubes 11 are also welded along their top ends to the adjacent container wall 15 and to each other.

A deflector member 20 which in cross section is an inverted channel with diverging sides is positioned between the tops of tubes 11 and the top of the container 10, and this turns the water and gas mixture downwards towards the bottom of the container 10 and if desired against the up-flow and permits an efficient separation of the gas from the water. The gas then passes through an outlet 21 in the top of the container 10 to atmosphere, and takes with it any water evaporated from the water in the container and thereby cools the water in the container by a refrigerating effect.

In order to prevent water from being sucked back into the exhaust system, should the engine be stopped or the engine run in a reverse as can sometimes happen with a diesel engine, the container 10 is provided with a vent 23 above the water level 13, which communicates with the inlet duct 14. Deflector vanes 22 and 24 are provided on the inlet duct and container side respectively. These vanes cause water passing up the tube underneath the vane 24 to be deflected into the gas stream passing through inlet duct 14 to carry out an initial quench.

As all of the tubes 11 have inlets at the same level the tube adjacent the inlet duct discharges first and as the gas pressure builds up the flow extends along the tubes away from the inlet duct, thereby ensuring flow to the deflector vane 24 under all flow conditions.

The flow of water when the conditioner is in use prevents gas entering the container 10 by aperture 23 and when the conditioner is not being used prevents any vacuum forming in the inlet duct 14 as the system cools down and thus acts as an anti-suckback device.

The container is provided with safety devices such as temperature controls (not shown) and drain plug 27, washout plug 28, water inlet 29, water level float 30, baffle 31 and inspection cover 32. The container may also have a bottom which slopes towards the gas distribution member 16 so that any sediment may be drained out through drain plug 27.

To overcome the possibility of any hot spots on the container walls the inlet duct 14 and distribution member 61 may be spaced therefrom by passages 25 and 26. These passages may be air cooled or they may be within the container structure and water cooled.

To minimize corrosion the container and other components are preferably fabricated from stainless steel.

As well as acting as a gas conditioner the device of this invention also serves as a flame trap for the exhaust gases.

We claim:

1. An exhaust gas conditioner comprising a container, a gas inlet duct leading into said container and spaced from the interior walls thereof, a gas outlet duct leading from said container, the latter having a water receiving portion, a gas distribution member connected to said inlet duct and passing below the water level in said receiving portion and spaced from said interior walls, said distribution member having a plurality of apertures positioned below associated mixing tubes which extend to above said water level, the gas after passing into said distribution member discharging up through said apertures and inducing a flow of water up through said tubes, and a deflector member for deflecting water issuing from said tubes and discharging it back towards the water in said receiving portion, whereby the entrained gas is separated from the water and passes out through said outlet duct, each of said apertures having an associated tubular portion for directing gas from said distribution member into the cooperating mixing tube and thereby inducing the water flow into said mixing tube around said tubular portion, said inlet duct being vented to said container, and further comprising vanes for directing water issuing from the mixing tube nearest said inlet duct through said vent into the gas passing along said inlet duct, characterized in that said distribution member is positioned in a recess in the bottom of said container, which slopes towards said recess, whereby any sediment which forms in the water falls below the lower ends of said mixing tubes and into said recess, and further comprising a drain plug for removing the sediment from said recess.

References Cited

UNITED STATES PATENTS

| | | | |
|---|---|---|---|
| 2,678,261 | 5/1954 | Ruth | 60—30 |
| 2,773,735 | 12/1956 | Ruth | 60—30 |
| 2,790,506 | 4/1957 | Vactor | 60—30 |

FOREIGN PATENTS

| | | | |
|---|---|---|---|
| 867,330 | 7/1941 | France | 55—249 |

MARK M. NEWMAN, Primary Examiner

D. HART, Assistant Examiner

U.S. Cl. X.R.

55—256, 257; 60—30